United States Patent [19]

Meszaros

[11] Patent Number: 5,020,710
[45] Date of Patent: Jun. 4, 1991

[54] HAND SUPPORTED BERRY RECEPTACLE

[76] Inventor: William A. Meszaros, Box 6, Whitewood, Saskatchewan, Canada, S0G 5C0

[21] Appl. No.: 504,940

[22] Filed: Apr. 5, 1990

Related U.S. Application Data

[63] Continuation-in-part, of Ser. No. 316,300, Feb. 27, 1989, abandoned.

[51] Int. Cl.⁵ .................................... A01D 46/00
[52] U.S. Cl. ................................ 224/219; 224/217; 224/218; 224/221; 56/328.001
[58] Field of Search .............. 224/901, 217, 218, 219, 224/220, 221, 222, 267; 56/328.1, 329, 202

[56] References Cited

U.S. PATENT DOCUMENTS

| | | | |
|---|---|---|---|
| 852,082 | 4/1907 | Smith | 224/221 |
| 907,012 | 12/1908 | Day | 224/217 |
| 1,129,492 | 2/1915 | Hyslin | 224/217 |
| 1,184,628 | 5/1916 | Crowner | 224/217 X |
| 1,307,256 | 6/1919 | Jacobson | 224/219 |
| 1,583,041 | 5/1926 | Herrick | 224/218 |
| 1,640,004 | 8/1927 | Lundblad | 224/217 |
| 1,978,877 | 10/1934 | Arnold | 224/218 |
| 2,064,523 | 12/1936 | Deutcher | 224/218 |
| 2,376,440 | 5/1945 | Mansfield | 56/328.1 |
| 2,377,623 | 6/1945 | French | 224/217 |
| 2,453,392 | 11/1948 | Williams | 224/217 |
| 2,764,328 | 9/1956 | Popp | 224/217 |
| 2,931,160 | 4/1960 | Buys et al. | 56/328.1 |
| 4,184,528 | 1/1980 | Kobilan | 224/219 |

FOREIGN PATENT DOCUMENTS 112311 10/1964 Czechoslovakia .................. 224/219

Primary Examiner—Ernest G. Cusick
Attorney, Agent, or Firm—Irell & Manella

[57] ABSTRACT

Normally berries are picked by one hand and transferred to a container held in the other hand or suspended from the belt or hanging around the neck and often berries slip from the fingers while transferring the berries to the container. The present device is a small container attached to the hand used for picking the berries, in a such way that the berries all fall into the container whether picked by the thumb and forefinger or stripped by the thumb and forefinger and middle finger of the hand. It is provided with a cutout portion on one side into which is engaged the edge of the hand adjacent to the fourth finger and adjustable straps support the container or cup from the fourth finger and around the thumb and wrist of the hand so that the container hangs substantially below the third or ring finger so that all the berries drop into the container.

16 Claims, 4 Drawing Sheets

HAND SUPPORTED BERRY RECEPTACLE

BACKGROUND OF THE INVENTION

This invention relates to new and useful improvements in containers to receive berries picked by hand. And is a continuation-in-part of U.S. application Ser. No. 316,300 filed Feb. 27, 1989.

Whereas larger fruit may be picked one at a time and placed in a container with the minimum of difficulty, berries, particularly stem type berries and fruits such as cherries are often picked several berries at a time either by pulling them from a cluster or stripping berries from a stem either by the thumb and forefinger of the hand or between the first and second fingers of the hand. An attempt is made to retain these berries in the palm of the hand so that they may be transferred to a container held either in the other hand, suspended around the neck of the picker or from the belt thereof and it is well known that many berries escape from the hand as they are being stripped or picked from the bush or tree.

The present invention overcomes disadvantages inherent with conventional berry picking procedures by attaching a small container to the hand used to pick the berries, in such a way that the berries automatically fall into the container which may then be emptied into a larger container when full.

One aspect of the invention is to provide a berry receiving container having an open upper side, and means to support same from the hand of the user, used for picking berries, said means including strap means extending from the container to support same from the hand substantially below the third or ring finger thereof when the hand is held in the substantially vertical position with the fourth finger on the under side.

Another advantage of the container and its method of attachment is that the hand is partially inside the container rather than outside the container so that all of the berries picked or stripped from the bush in one action, fall into the container with the minimum chance of loss occurring.

Another advantage of the invention is that the thumb and forefinger may be used to pick the berries or, alternatively, they may be stripped between the forefinger and ring finger of the hand so that individuals with a partial thumb loss may pick berries readily and easily.

A still further advantage of the invention is to provide a device of the character as herein described which is simple in construction, economic in the manufacture and otherwise well suited to the purpose to which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
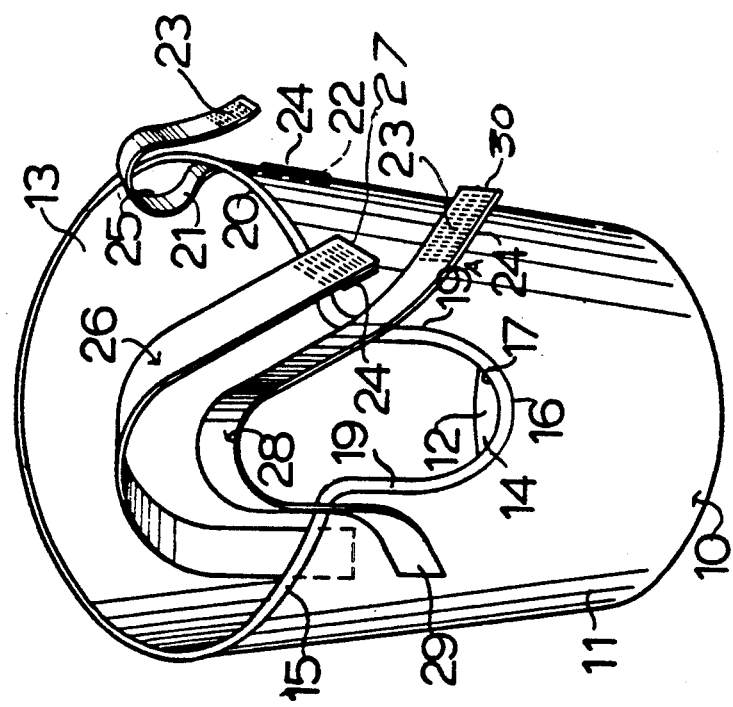
FIG. 1 is an isometric view of the container per se.
Figure 5:
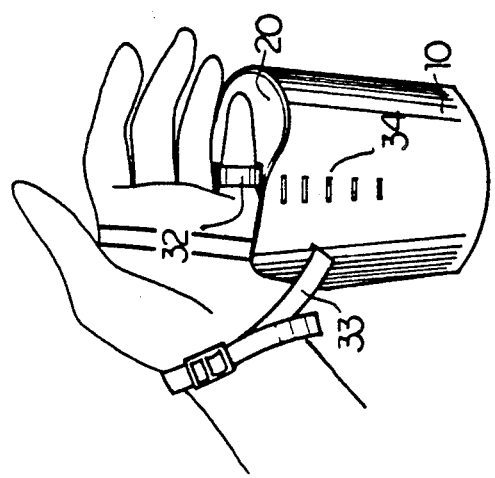
FIG. 5 is similar to FIG. 2 but showing the new embodiment adjusted for use with the left hand.
Figure 6:
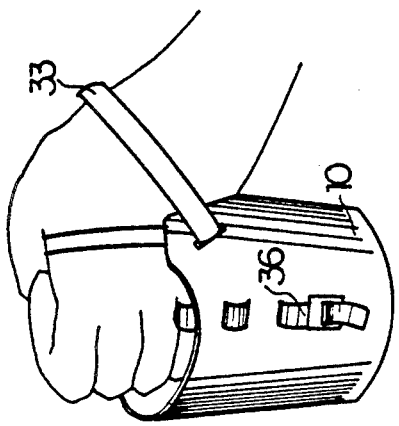
FIG. 6 is similar to FIG. 3 but showing the improved embodiment and adjusted for use with the left hand.
Figure 4:
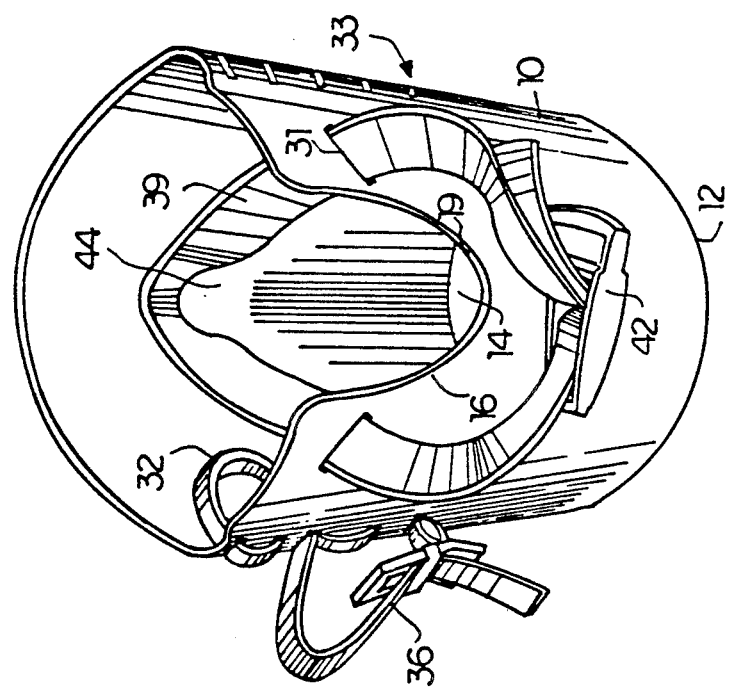
FIG. 4 is a view similar to FIG. 1 but showing the preferred embodiment adjusted for use with the left hand.

Proceeding therefore to describe the invention in detail, reference should first be made to FIG. 1 in which 10 illustrates a substantially cylindrical container having a perimetrical wall 11, a base 12 and an open upper end 13.

A cutout portion 14 is formed in the wall 11 and extends downwardly from the upper edge 15 terminating at a point 16 part way down the wall of the container and having a rounded base 17 as clearly shown in FIG. 1.

Figure 2:
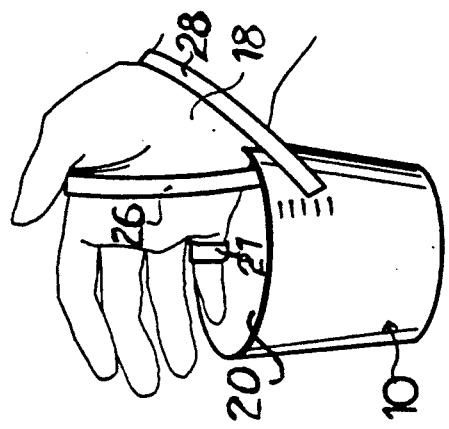
FIG. 2 is a view of the container attached to the hand shown in front vertical elevation.
Figure 3:
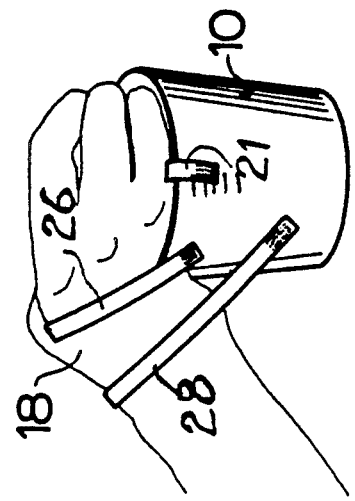
FIG. 3 is a view similar to FIG. 2 but showing the rear view of the hand and container secured thereto.

Reference to FIG. 3 will show that this cutout portion 14 is adapted to receive the side of the palm of the hand 18 adjacent the little or fourth finger of the user, when the hand is held in the substantially vertical position as shown in FIGS. 2 and 3, it being understood that the width of the cutout portion between the substantially vertical side walls or edges 19 is sufficient to receive this portion of the hand readily and easily.

The depth of the cutout portion 14 is such that when the hand is engaged within the cutout with the fingers extending across the container, the fourth or little finger is situated within the upper end of the container and adjacent the inner side of the wall portion indicated by reference character 20 in FIG. 1.

Strap means are provided to detachably secure the container in the vertical position below the edge of the hand when the hand is held substantially vertically, said strap means including a little or fourth finger engaging strap 21 secured by the inner end 22, to the inside of the wall 11 as by stapling or other suitable means.

This strap extends over the upper edge 15 and is provided with hook and loop fastening means 23 and 24 for securing this distal end on the outside of the wall 11 as clearly shown in FIG. 1. This means that the loop 25 formed by attaching the distal end to the wall, may be adjusted and is adapted to receive the aforementioned fourth finger when the container is engaged upon the hand as shown in FIGS. 2 and 3 as previously described.

A second or thumb engaging strap 26 is secured by one end to the inner wall of the container by means similar to that hereinbefore described, adjacent the upper end of one vertical edge 19 of the cutout portion 14 and this extends over the thumb of the user between the thumb and first or fore finger and is detachably secured by the distal end 27 thereof by hook and loop means as hereinbefore described and situated on the outside of the wall 11 adjacent to the opposite vertical edge specifically designated 19A of the cutout portion.

A third or wrist engaging strap 28 is secured by one end 29 thereof to the outside of wall 11 adjacent the one vertical edge 19 of the cutout portion and just below the attachment of strap 26.

This extends over the wrist of the user and the distal end 30 is again detachably secured to the outside of the wall 11 by hook and loop means 23 and 24 as clearly shown in FIG. 1.

In use, the hand is inserted into the cutout portion as hereinbefore described with the fourth finger engaging the loop 25 adjusted by the free or distal end of strap 21.

Strap 26 is then engaged over the thumb and between the thumb and first or forefinger and then passes across the back of the hand to be detachably secured to the outside of the wall of the container by the end 27.

The wrist strap 28 is passed around the back of the wrist and attached to the outside of the container by the free end 30 thereof and is situated just below the thumb engaging strap 26 as clearly shown.

These straps support the container against the lower edge of the hand along the back of the fourth finger, leaving the thumb and first three fingers completely clear and the fourth finger clear to a certain extend so that they can be manipulated above the open upper end of the container to detach berries from the stems or stalks thereof whereupon they drop into the container without spillage occurring. The lower side of the hand is within the upper portion of the container and against the inner surface of the wall.

It will of course be appreciated that although the drawings and description referred to a container useable by a right-handed person, nevertheless that by reversing the position of the straps, the container can be readily adapted for use by a left-handed person.

FIGS. 4 through 10 show the preferred embodiment of the device and although the device is designed for use with either hand, FIGS. 4 through 10 show the device adjusted for use upon the left hand of the user.

The container collectively designated 10 is similar in construction to the previously described container sc that similar reference characters have been used in this embodiment. It includes the parametrical wall 11, the base 12 and an open upper end 13 having a vertically situated cutout portion 14 formed through the wall 11 and extending downwardly from the upper edge 15 terminating at a point 16 part way down the wall of the container, said cutout portion having a rounded base 17 as clearly shown.

A diagonally situated slot 31 is formed through the wall of the container adjacent to the upper edge 15 thereof one upon each side of the side edges 19 of the cutout 14.

First and second adjustable strap means are provided and collectively designated 32 and 33.

Figure 9:
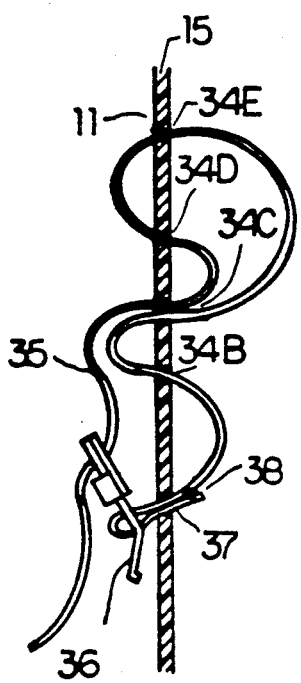
FIG. 9 is an enlarged fragmentary partially exploded view showing the engagement of the strap with the side wall of the container to define the fourth finger engaging loop.
Figure 10:
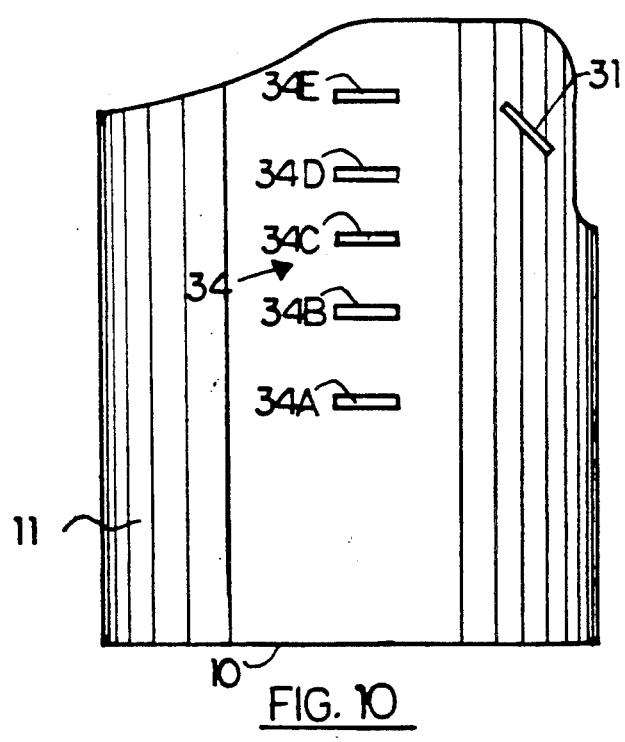
FIG. 10 is a fragmentary side elevation of the container per se.

The first adjustable strap means 32 is defined as a fourth finger engaging closed loop and maybe situated on either side of the cutout portion and secured by a plurality of spaced and parallel horizontally situated slots collectively designated 34 through the wall of the container as shown in FIGS. 9 and 10.

Five such horizontally situated slits are provided and identified by reference characters 34A, 34B, 34C, 34D and 34E.

The first strap means comprises a length of flexible material 35 having a fastening means in the form of a buckle assembly 36 secured to one end 37 thereof. It will be noted that slits 34A and 34C are of greater depth than the other three slits because lengths of the strap 35 pass through these two particular slits twice.

The length of material from the one end 37 thereof passes through the lowermost slit 34A, around the crossbar of the buckle 36 and then back through the lower most slit 34A to be heat sealed or otherwise secured upon itself as indicated by reference character 38 thus securing the buckle 36 to said one end.

The length of material then passes upwardly and then outwardly through the next lowermost slit 34B and then upwardly and inwardly through the next adjacent slit 34C whereupon it extends upwardly and outwardly through the uppermost slit 34E thus defining the fourth finger engaging loop 32 upon the interior of the container and adjacent the upper edge 15 thereof.

The material then extends downwardly and inwardly through the slit 34D situated between the next adjacent slot 34C and the uppermost slot 34E.

It then exits through slot 34C and engages the friction portion of the buckle portion 36 so that the size of the finger engaging loop 32 may be adjusted to suit the user.

It will be appreciated that this first strap means 32 can be situated within the slits 34 on either side of the cutout portion depending upon the right or left handedness of the user.

The second strap engaging means collectively designated 33 consists of a length of a flexible material 39 having one end 40 and another free end 41.

Figure 7:
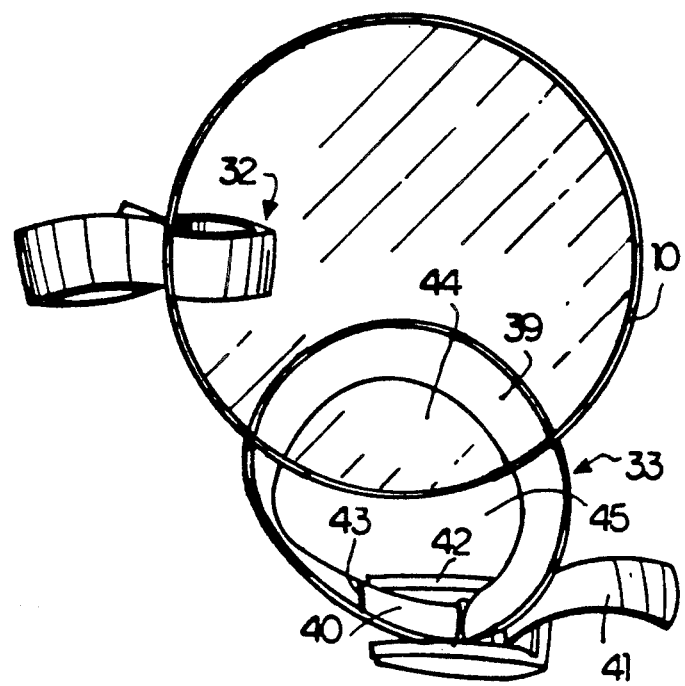
FIG. 7 is a top plan view of the improved embodiment.
Figure 8:
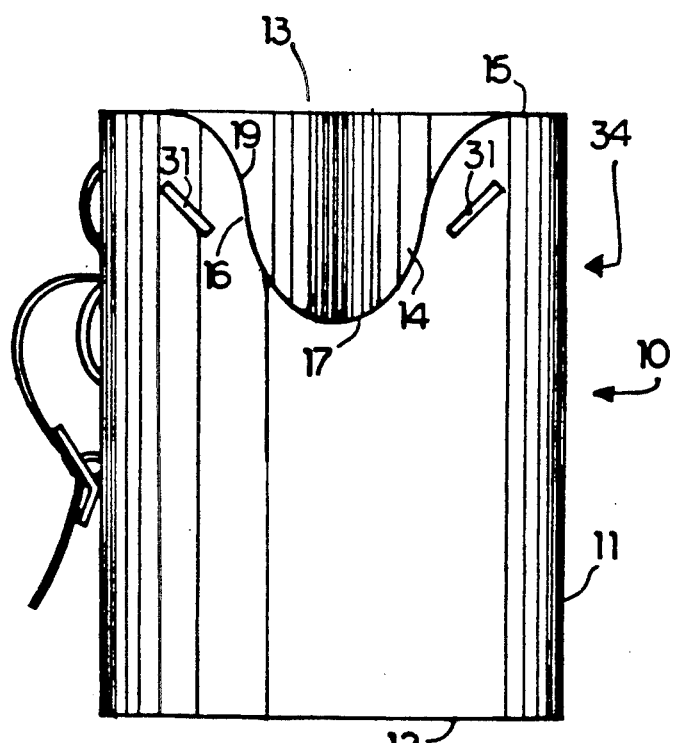
FIG. 8 is a side elevation facing the cutout portion.

The length of material extends through one of the slots 31 on one side of the cutout portion 14, from the outside to the inside, and then loops around and exits through the other slot 31 on the other side of the cutout portion so that the two ends are situated externally of the container as clearly shown in FIG. 7.

An adjustable buckle assembly 42 is secured to said one end 40 by heat sealing or the like indicated by reference character 43 and the other free end 41 frictionally engages the friction portion of the buckle assembly so that the entire loop assembly can be adjusted as to size.

When engaged through the container as shown in FIG. 7, the material defines an inner loop portion 44 within the upper end of the container 10 and an outer loop portion 45 exteriorly of the upper end or wall of the container 10.

In use, and regardless of whether the left or right hand is being utilized, the user engages the hand upwardly through the outer portion 45 of the loop so that this loop lies across the back of the wrist of the user.

The fingers then engage under the upper side of the inner portion 44 of the loop with the thumb engaging over the loop so that the loop crosses the palm of the hand and then engages under the thumb.

By adjusting the buckle assembly 42, and with the little or fourth finger engaged within loop 32, the container is held firmly and conveniently directly below the hand and fingers of the user so that the thumb and first three fingers can be used for the picking process.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A berry receiving container having an open upper side and a closed lower end, and means adapted to support said container from the hand of the user which is used for picking berries, said means including first and second strap means extending from the container to support said container from the hand whereby the container is supported from the hand substantially below the third or ring finger thereof when the hand is held in the substantially vertical position with the fourth finger located at the under side of the hand of the user, said container including an upper edge and a surrounding wall, a cutout portion having an open upper end and extending from said upper edge of said container, vertically downwardly through said wall and terminating in a rounded lower end spaced downwardly from said upper edge, said cutout portion engaging over the edge of the palm of the hand and adjacent to the fourth finger thereof, whereby at least the fourth finger of the hand is inside the container and extends across the open upper side of said container, said first strap means including a fourth finger engaging adjustable closed finger loop portion on the inside of said surrounding wall of said container, restraining the fourth finger against the inside of said surrounding wall below the open upper side of said container, a slot formed through the wall of said container, one upon each side of said cutout portion and adjacent to the upper edge of said container, said second strap means extending from the interior of said upper end of said container, through each of said slots, adjustable second strap fastening means cooperating with said second strap means to form a closed second strap loop having inner and outer portions, the inner portion being situated within said open end of said container and being engageable around the thumb of the hand of the user, the outer portion engaging over the wrist of the hand of the user thereby suspending the container below the thumb and fingers of the user.

2. The container according to claim 1 which includes a plurality of spaced and parallel horizontal slits formed through the wall of said container at a location spaced around from one side to said cutout portion, adjustable first strap fastening means cooperating with the first strap means to form an adjustable closed first strap loop, said first strap fastening means being outside of said container and adjacent the lowermost slit of said plurality of slits, said first strap means extending from the first strap fastening means through said lowermost slit and then upwardly and outwardly through the next lowermost slit and then upwardly and inwardly through the next adjacent slit, outwardly and then upwardly and outwardly through the uppermost slit thereby defining said fourth finger engaging closed finger loop portion on the inside of said container, said first strap means then extending downwardly and inwardly through the slit between said uppermost slit and said next adjacent slit, and then outwardly through next adjacent slit to selectively and operatively connect with said first strap fastening means.

3. The container according to claim 2 which includes two sets of spaced and parallel and horizontally situated slits formed through the wall of said container the sets of slits being positioned at locations spaced from respective sides of said cutout portion, said first strap means being selectively engageable with said sets of slits whereby said container can be selectively and operatively secured to the right or left hand of the user.

4. The container according to claim 3 in which said second strap means includes a thumb engaging loop portion extending up over the upper open end of said cutout portion.

5. The container according to claim 4 in which said thumb engaging loop portion has one end secured to the inner wall and another, distal end, to the outer wall.

6. The container according to claim 5 in which the diameter of said container decreases slightly from the open upper side thereof towards the closed lower end thereof.

7. The container according to claim 3 in which said second strap means includes a wrist engaging loop portion extending over said cutout portion.

8. The container according to claim 7 in which the diameter of said container decreases slightly from the open upper side thereof towards the closed lower end thereof.

9. The container according to claim 3 in which the diameter of said container decreases slightly from the open upper side thereof towards the closed lower end thereof.

10. The container according to claim 4 in which said second strap means includes a wrist engaging loop portion extending over said cutout portion.

11. The container according to claim 10 in which the diameter of said container decreases slightly from the open upper side thereof towards the closed lower end thereof.

12. The container according to claim 4 in which the diameter of said container decreases slightly from the open upper side thereof towards the closed lower end thereof.

13. The container according to claim 8 in which the diameter of said container decreases slightly from the open upper side thereof towards the closed lower end thereof.

14. The container according to claim 1 in which said first strap means can be selectively secured to the surrounding wall of said container on either side of said cutout portion whereby said container can be selectively and operatively secured to the right or left hand of the user.

15. The container according to claim 2 in which the diameter of said container decreases slightly from the open upper side thereof towards the closed lower end thereof.

16. The container according to claim 1 in which the diameter of said container decreases slightly from the open upper side thereof towards the closed lower end thereof.

* * * * *